United States Patent
Shirakawa

(10) Patent No.: US 7,404,196 B2
(45) Date of Patent: Jul. 22, 2008

(54) DISC APPARATUS

(75) Inventor: Tomohiro Shirakawa, Osaka (JP)

(73) Assignees: Funai Electric Co., Ltd., Osaka (JP);
Mitsubishi Electric Corporation,
Tokyo (JP)

( * ) Notice: Subject to any disclaimer, the term of this patent is extended or adjusted under 35 U.S.C. 154(b) by 548 days.

(21) Appl. No.: 11/189,105

(22) Filed: Jul. 26, 2005

(65) Prior Publication Data

US 2006/0026620 A1    Feb. 2, 2006

(30) Foreign Application Priority Data

Jul. 27, 2004    (JP)    ............................. 2004-218122

(51) Int. Cl.
*G11B 33/02*    (2006.01)
(52) U.S. Cl. .................................... 720/608
(58) Field of Classification Search ............... 720/608, 720/606, 626, 614; 369/75.2
See application file for complete search history.

(56) References Cited

U.S. PATENT DOCUMENTS

| | | | |
|---|---|---|---|
| 5,128,918 A * | 7/1992 | Suzuki et al. ............... | 720/608 |
| 5,563,865 A * | 10/1996 | Wheeler ..................... | 720/608 |
| 6,169,711 B1 | 1/2001 | Koh ............................ | 369/33 |
| 7,159,225 B2 * | 1/2007 | Sakano et al. ............... | 720/614 |
| 7,194,746 B2 * | 3/2007 | Shirakawa et al. .......... | 720/608 |
| 2001/0030926 A1 * | 10/2001 | Tanaka et al. ............... | 369/75.2 |
| 2005/0066341 A1 * | 3/2005 | Tokunaga .................... | 720/606 |

FOREIGN PATENT DOCUMENTS

| | | |
|---|---|---|
| EP | 0 833 321 | 4/1998 |
| JP | 6-119698 | 4/1994 |
| JP | 6-338119 | 12/1994 |
| JP | 2001-216702 | 8/2001 |
| JP | 2002-100099 | 4/2002 |
| WO | WO 01/57865 | 8/2001 |
| WO | WO 2004/070719 | 8/2004 |

* cited by examiner

*Primary Examiner*—Tianjie Chen
(74) *Attorney, Agent, or Firm*—Morgan, Lewis & Bockius LLP

(57) ABSTRACT

A disc apparatus including: a disc tray on which a disc is mounted; an optical pickup unit which irradiates a light beam on the disc; a traverse assembly unit on which the optical pickup unit is mounted; a driving motor which is a power source for operating the disc tray, the optical pickup unit, and the traverse assembly unit; an inner circumference arrival sensor which detects whether the optical pickup unit arrives at the inner circumference of the disc; and an encoder sensor which detects the number of rotations of the driving motor when the driving motor rotates clockwise or counterclockwise, wherein based on the number of rotations of the driving motor in the clockwise direction, the optical pickup unit is moved to the inner circumference of the disc, and then the traverse assembly unit descends, so that the disc tray is opened.

6 Claims, 14 Drawing Sheets

DISC APPARATUS

BACKGROUND OF THE INVENTION

1. Field of the Invention

The present invention relates to a disc apparatus for, for example, a CD and a DVD.

2. Description of the Related Art

In a commonly used disc apparatus (for example, see JP-A-2002-100099, JP-A-6-119698, JP-A-6-338119 and JP-A-2001-216702), a disc tray (tray) is opened or closed (unloading/loading) at a slit-shaped entrance which is provided in a front panel of an exterior housing by driving force of a driving motor.

Generally, the disc apparatus includes a switch (tray open switch) for detecting whether the tray is opened completely, in order to stop the operation of the driving motor for driving the disc tray, when the disc tray is opened (when the opening of the tray is completed).

In addition, there can be different types of disc apparatuses, such as a disc apparatus in which a stopper or the like is provided in the vicinity of a slit-shaped entrance and in which the operation of the driving motor is stopped when the tray comes into contact with the stopper, as disclosed in JP-A-6-338119, and a disc apparatus in which the operation of the driving motor of the disc tray is stopped after a predetermined time elapsed, as disclosed in JP-A-2001-216702.

However, in the case in which the tray open switch is provided in the disc apparatus, the tray open switch must be provided at a position where the tray open switch does not obstruct the operation of an OPU (optical pickup unit) and the driving motor. That is, since the tray open switch is provided in a limited space inside the disc apparatus, which causes the flexibility of the design to be lowered. Further, it is required to provide, for example, a dedicated printed circuit board for controlling the tray open switch, which causes the flexibility of the design to be further lowered.

In addition, the provision of the tray open switch increases the number of components which constitute the disc apparatus, resulting in an increase in the manufacturing costs of the disc apparatus.

Also, in the movement control of the disk tray by time control, it is common to set the time longer than the required time in order to prevent the disc tray from stopping in the middle of an opening operation. In addition, many disc apparatuses include a stopper which is provided in the vicinity of the slit-shaped entrance to stop the disc tray when the disc tray comes into contact with the stopper. Therefore, the disc tray does not stop smoothly, and thus a high-quality operation cannot be performed.

SUMMARY OF THE INVENTION

The present invention has been made to solve the above problems. An object of the invention is to provide a disc apparatus in which a tray open switch which detects whether a disc tray is opened completely is not provided, thereby improving the flexibility of the design, and thus the manufacturing costs of the disc apparatus can be decreased, and a high-quality moving operation of the disc tray can be guaranteed.

According to an aspect of the invention, a disk apparatus includes a disc tray on which a disc is mounted; an optical pickup unit (OPU) which irradiates a light beam on the disc; a traverse assembly unit (TAU) on which the optical pickup unit is mounted; a driving motor which is a power source for operating the disc tray, the optical pickup unit, and the traverse assembly unit; an inner circumference arrival sensor which detects whether the optical pickup unit arrives at the inner circumference of the disc; and an encoder sensor which detects the number of rotations of the driving motor when the driving motor rotates clockwise or counterclockwise. In the disk apparatus, based on the number of rotations of the driving motor in the clockwise direction which is detected by the encoder sensor, the optical pickup unit is moved to the inner circumference of the disc, and then the traverse assembly unit descends, so that the disc tray is opened.

According to the above-mentioned structure, since 'the optical pickup unit', 'the traverse assembly unit', and 'the disc tray' can be operated based on the encoder control, the respective members can be operated in an extremely smooth manner. In addition, since it is possible to know the location of the disc tray when the disc tray is completely opened by the encoder control, a tray open switch is not required. As a result, the flexibility of the design can be improved, and the manufacturing costs of the disc apparatus can be decreased. In addition, a high-quality moving operation of the disc tray can be guaranteed.

In addition, in the above-mentioned structure, preferably, the optical pickup unit is moved to the inner circumference of the disc by rotating force of the driving motor based on a first voltage. Then, as soon as the inner circumference arrival detecting sensor detects that the optical pickup unit arrives at the inner circumference of the disc, the number of rotations of the driving motor be reduced to a first predetermined number of rotations by rotating force based on a second voltage to move the traverse assembly unit down. Subsequently, the number of rotations of the driving motor is reduced to a second predetermined number of rotations by rotating force based on a third voltage, and then the number of rotations of the driving motor is reduced to a third predetermined number of rotations by gradually lowering the third voltage to open the disc tray. In this case, absolute values of the first to third voltages satisfy the following relationship: the first voltage<the third voltage<the second voltage.

Also, in the above-mentioned structure, preferably, when the disc tray is closed, the traverse assembly unit ascends, and the optical pickup unit is moved to the outer circumference of the disc by the counterclockwise rotation of the driving motor. In addition, the number of rotations of the driving motor increases up to a fourth predetermined number of rotations by gradually increasing the voltage to a fourth predetermined voltage, and then the number of rotations of the driving motor increases to a fifth predetermined number of rotations by rotating force based on the fourth voltage to close the disc tray. Then, until the inner circumference arrival detecting sensor detects that the optical pickup unit is moved away from the inner circumference of the disc, the traverse assembly unit ascends by rotating force based on the fifth voltage. In this case, absolute values of the fourth and fifth voltages satisfy the following relationship: the fourth voltage<the fifth voltage.

As described above, if the voltage applied to the driving motor is varied, at the time of the opening or closing of the disc tray, the disc tray can be opened or closed in an extremely smooth manner, and appropriate driving force can be supplied to the respective members even when the traverse assembly unit ascends, that is, even when strong rotating force is required (when high torque is required).

Further, according to another aspect of the invention, a disc apparatus includes a driving motor which is a power source; a disc tray that includes a tray rack for receiving driving force for opening and closing based on driving force of the driving motor and tray grooves, which are conjunction mechanisms, and that is provided to be openable in a main body of the disc apparatus in a sliding manner, with a disk mounted thereon; an optical pickup unit which includes an OPU rack having a first boss, which irradiates a light beam onto the disc, which is provided such that it can reciprocate between inner and outer circumference of the disc, and which receives reciprocating driving force based on the driving force of the driving motor; an inner circumference arrival detecting sensor which detects whether the optical pickup unit arrives at the inner circumference of the disc, a traverse assembly unit which is provided such that it can be elevated, the traverse assembly unit including a traverse holder having a second boss for receiving elevating driving force based on the driving force of the driving motor; a lever trigger having a coupling boss and a first groove which engages with the first boss of the OPU rack so as to move in conjunction with the movement of the OPU; and a gear set which transmits the driving force of the driving motor; a loader chassis unit which includes the driving motor mounted thereon; a gear tray having an intermittent portion that receives or not transmits the driving force of the driving motor via the gear set journaled thereon; and a cam slider including a cam slider rack which engages with the gear tray, a cam groove which engages with the second boss of the traverse holder, a standing boss which engages with the tray grooves of the disc tray, a coupling groove which engages with a coupling boss of the lever trigger, the cam slider interlocking the traverse holder and the disc tray and being moved in conjunction with the movement of the lever trigger; and an encoder sensor which detects the number of rotations of the driving motor when the driving motor rotates clockwise or counterclockwise. In the disk apparatus, the OPU rack receives the driving force transmitted via the gear set, and then moves the optical pickup unit to the inner circumference of the disc, based on the number of rotations of the driving motor in the clockwise direction which is detected by the encoder sensor. The lever trigger having the first groove engaging with the first boss is moved in conjunction with the movement of the first boss to the inner circumference by the movement of the OPU rack. The cam slider having the coupling groove that engages with the coupling boss slides is moved in conjunction with the movement of the coupling bass according to the movement of the lever trigger. The gear tray engaging with the cam slider rack by the sliding operation receives the driving force via the gear set to be rotated. The cam slider further slides by the rotation of the gear tray to operate the traverse holder having second bass that engages with the cam groove, thereby moving the traverse assembly unit downward The disc tray having the tray grooves that engage with the standing boss moves in the opening direction in conjunction with the sliding of the cam slider, and the tray rack engages with the gear tray, so that the disk tray is opened by the driving force transmitted through the gear set.

The invention operates 'the OPU', 'the TAU', and 'the disc tray' based on the encoder control such that the respective members can be operated in an extremely smooth manner. Also, since the location of the disc tray where the disc tray is completely opened can be detected by the encoder control, a tray open switch is not required.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Hereinafter, an embodiment of the present invention will be described with reference to the accompanying drawings.

Figure 1:
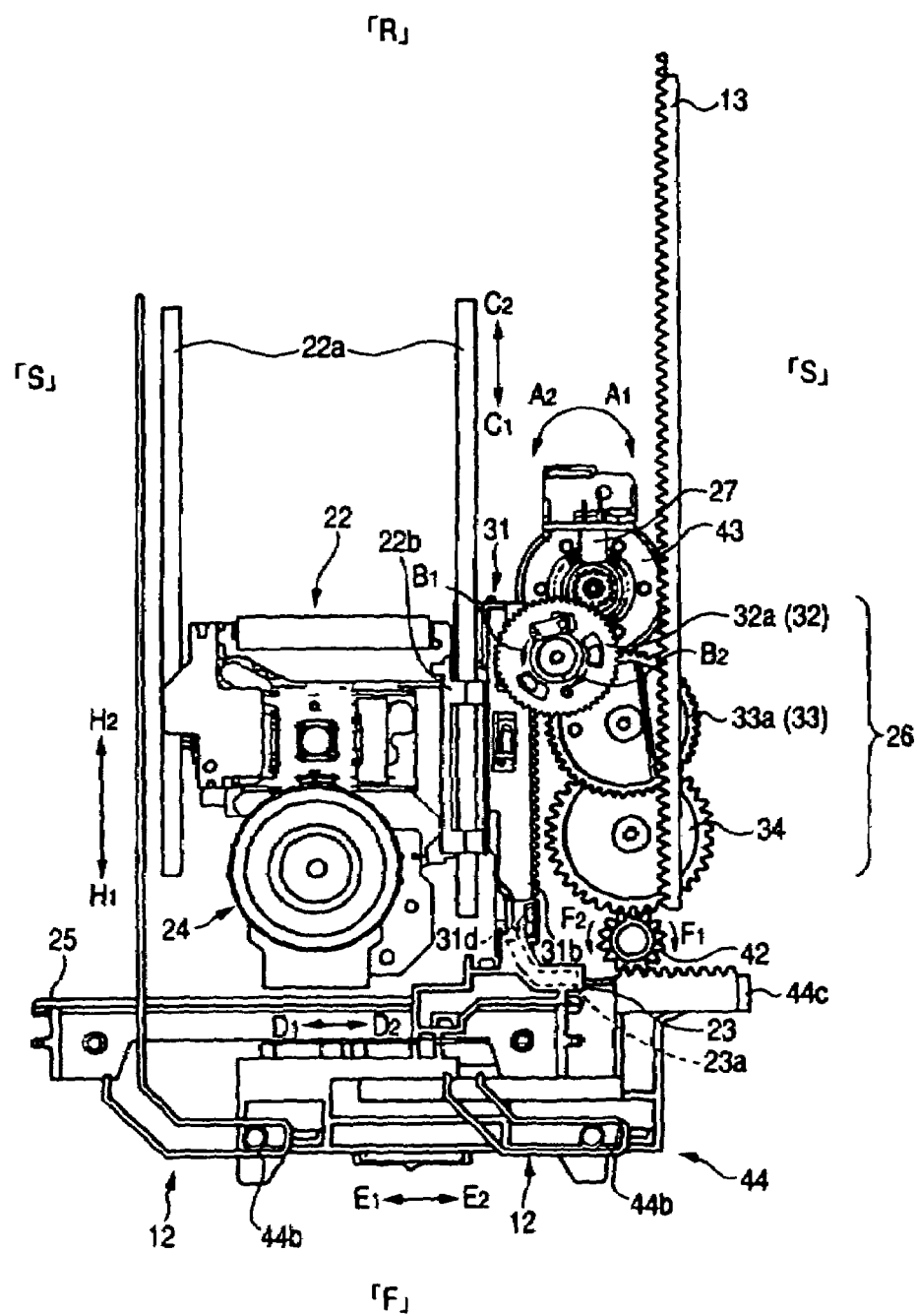
FIG. 1 is a view schematically illustrating the internal structure of a disc apparatus of the invention with a loader chassis, which is shown in FIG. 5, removed.
Figure 2:
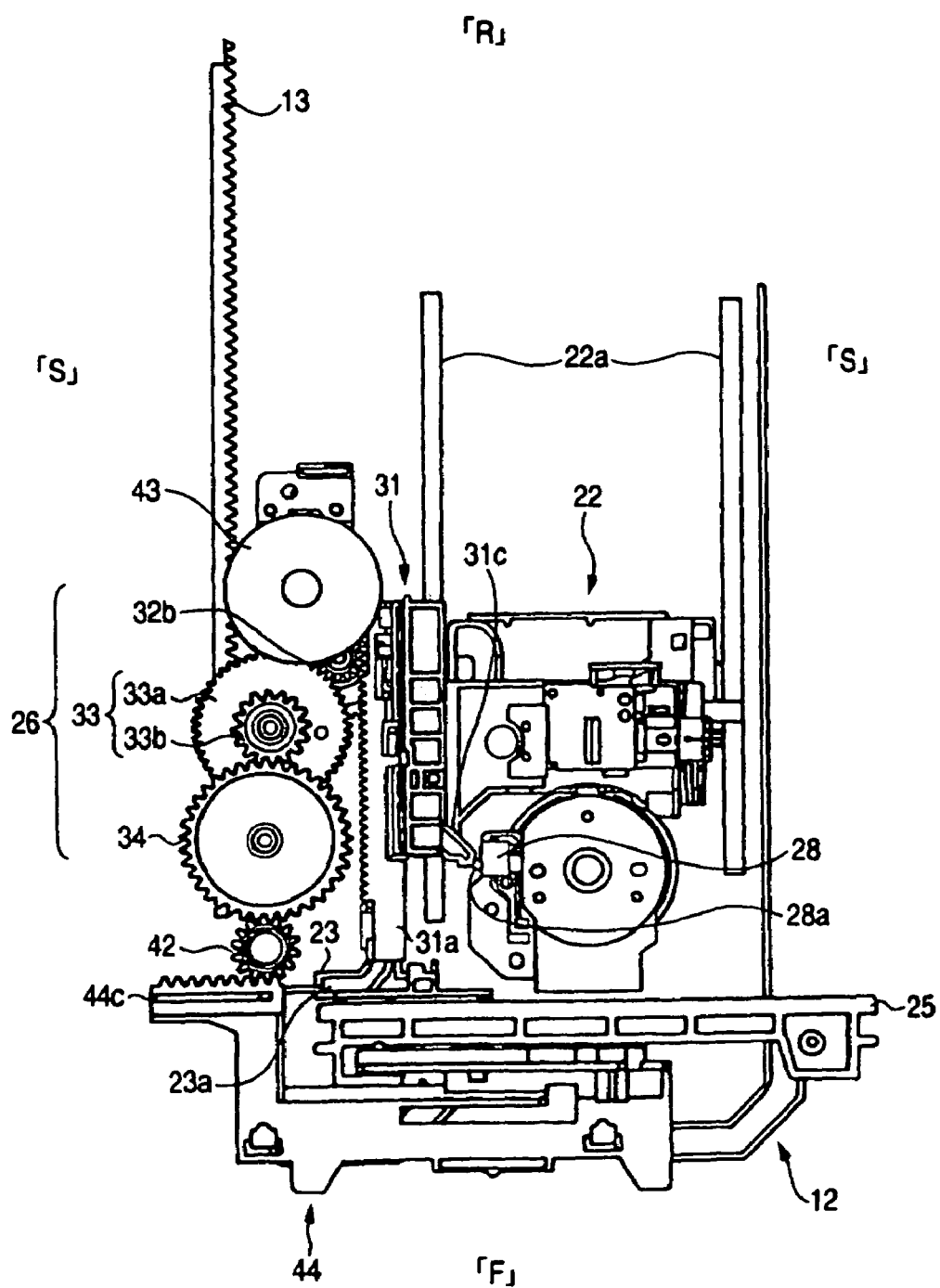
FIG. 2 is a view schematically illustrating the internal structure of the disc apparatus, as viewed from the lower side.
Figure 3:
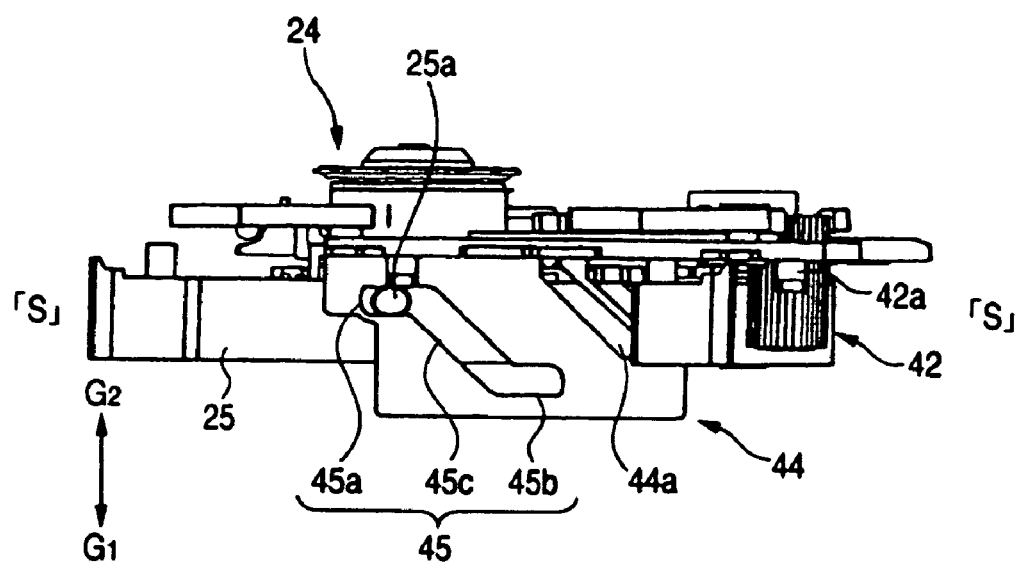
FIG. 3 is a view schematically illustrating the internal structure of the disc apparatus, as viewed from a front panel.
Figure 4:
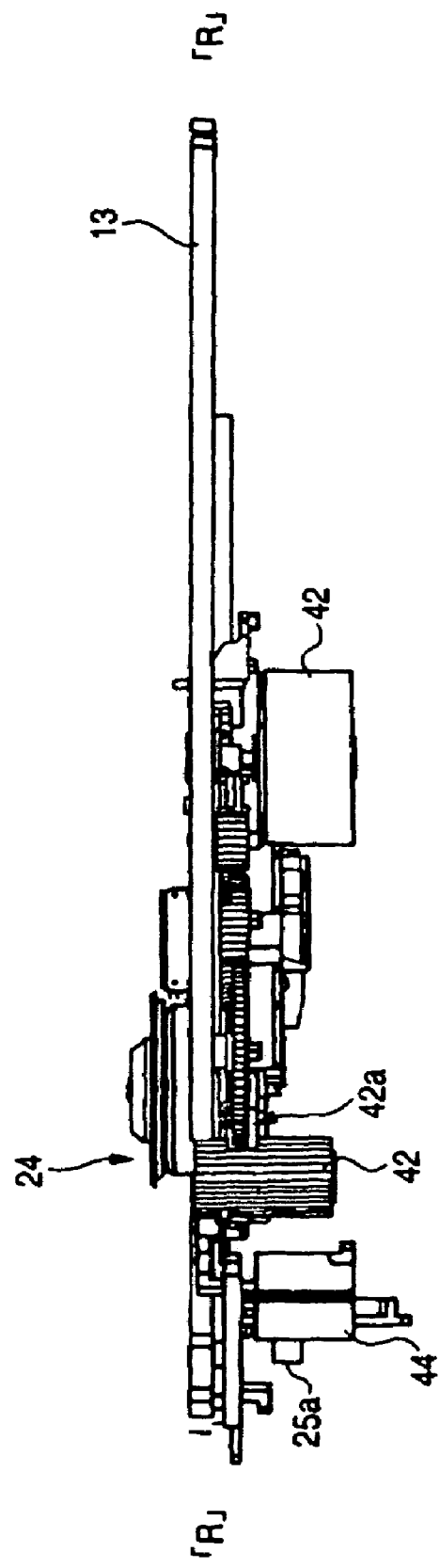
FIG. 4 is a view schematically illustrating the internal structure of the disc apparatus, as viewed from the side.
Figure 5:
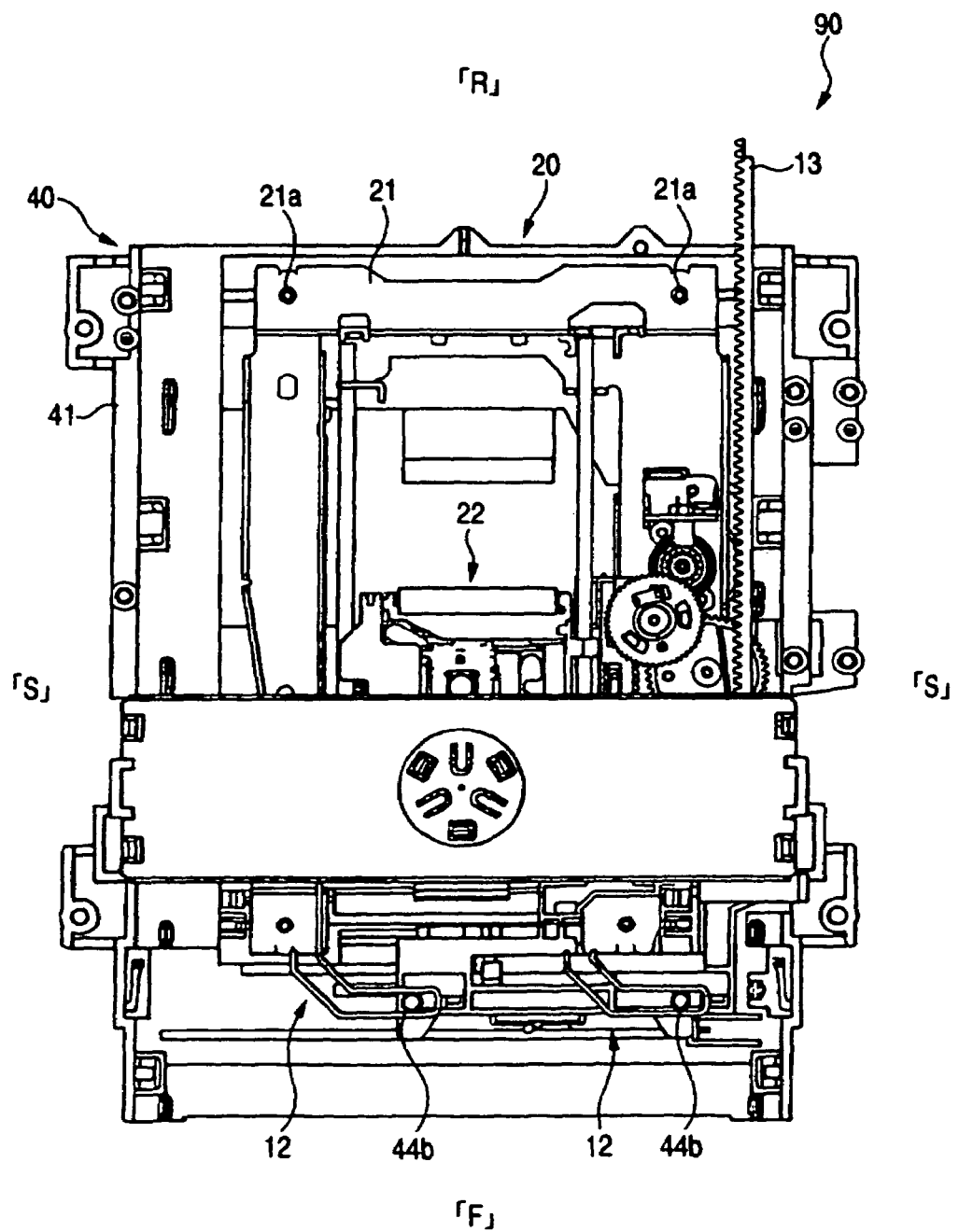
FIG. 5 is a view schematically illustrating the internal structure of the disc apparatus of the invention.
Figure 6:
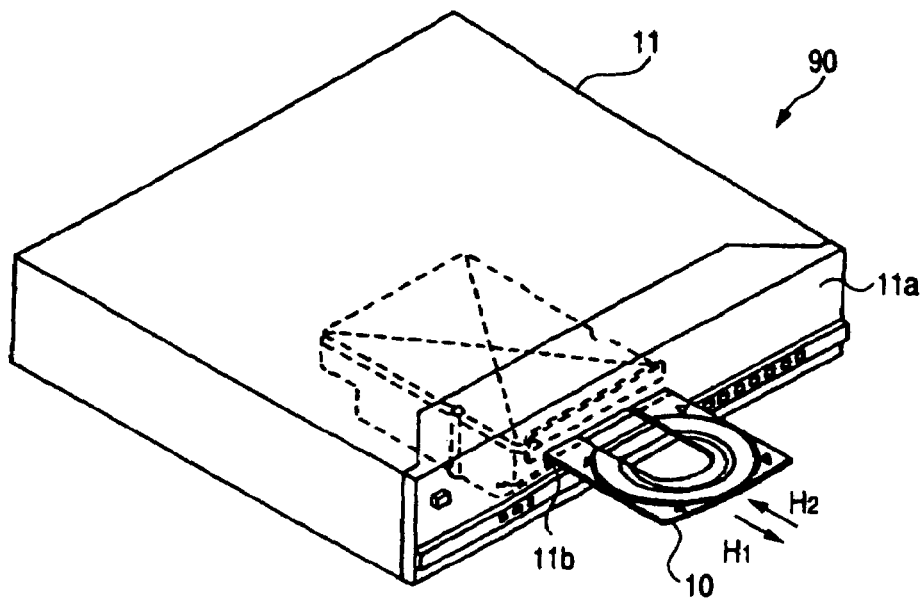
FIG. 6 is a perspective view of the disc apparatus of the invention.

FIGS. 1 to 6 show a disc apparatus 90 of the invention. FIG. 6 is a perspective view of the disc apparatus. FIG. 5 is a view schematically illustrating the internal structure of the disc apparatus, as viewed from an upper side, and FIG. 1 is a view schematically illustrating the internal structure of the disc apparatus with a loader chassis (which will be described later) shown in FIG. 5 removed. FIG. 2 is a view schematically illustrating the internal structure of the disc apparatus, as viewed from a lower side (a bottom part), and FIG. 3 is a view schematically illustrating the internal structure of the disc apparatus, as viewed from a front panel. FIG. 4 is a view schematically illustrating the internal structure of the disc apparatus, as viewed from the side. For the convenience of explanation, FIGS. 1 to 4 do not indicate a disc tray 10, and indicate only tray grooves 12 and a tray rack 13.

As regards the disc apparatus

The disc apparatus 90 includes the disc tray 10 (see FIG. 6), a traverse assembly unit (TAU) 20, and a loader chassis unit (LCU) 40 (see FIG. 5).

As regards the disc tray

As shown in FIG. 6, the disc tray 10 carries a disc, and can go out and come in through a slit-shaped entrance 11b which is provided at a front panel 11a of an exterior housing 11 (the disc tray 10 can come in (loading)/go out (unloading)).

Also, in order to reciprocate the disc tray 10, as shown in FIG. 1, the disc tray 10 is provided with the tray grooves 12 which curve step by step so as to have L shapes (a long portion of the L shape is placed along the length of the disc tray 10, and a short portion of the L shape is placed along the width of the disc tray 10), and the tray rack 13 which transmits driving force from a gear tray, which will be described later, along the length of the disc tray 10.

Hereinafter, a direction in which the front panel 11a is provided is expressed as a front part (F), and a direction which is opposite to the above direction is expressed as a rear part (R). In addition, a direction which is perpendicular to the above directions is expressed as a side part (S) (these will be denoted in the drawings).

As regards the traverse assembly unit

As shown in FIG. 1, the traverse assembly unit 20 (TAU; see FIG. 5) includes a traverse assembly 21 (see FIG. 5), an optical pickup unit (OPU) 22, a lever trigger 23, a spindle motor 24, a traverse holder 25, a driving force transmitting gear set (gear set) 26, a transmission type sensor (encoder sensor) 27, and a contacting sensor (inner circumference arrival detecting sensor) 28 (see FIG. 2).

The traverse assembly 21 is a frame on which the OPU 22, the lever trigger 23, the spindle motor 24, the traverse holder 25, the driving force transmitting gear set (gear set) 26, the transmission type sensor (encoder sensor) 27, and the contacting sensor (inner circumference arrival detecting sensor) 28 are mounted. In addition, the traverse assembly 21 is fixed to an end of the rear part of a loader chassis (which will be described later) with a screw.

Specifically, as shown in FIG. 5, a floating rubber (damper) 21a is interposed (inserted) into each attaching hole provided in the traverse assembly 21. The floating rubber (damper) 21a covers portions around the attaching holes (circumference) and both end sides of the attaching holes, and has an opening respectively, which is so large that a round boss, which is provided at the loader chassis 41, can be inserted. The round bosses are inserted into the attaching holes, and the traverse assembly 21 is mounted on the loader chassis 41, and then the attaching holes of the traverse assembly 21 are fixed to the round bosses of the loader chassis 41 with attaching screws.

When the attaching holes are fixed to the round bosses with the attaching screws, it is preferable to maintain a certain gap between heads of the attaching screws and the loader chassis 41. Then, the traverse assembly unit 20 can rotate around the attaching screw, thereby the traverse assembly unit 20 ascends when a disc is reproduced (in the case of chucking), and the traverse assembly unit 20 descends except for the case of chucking.

The OCU 22 irradiates light (for example, a laser beam) on an optical disc to record/reproduce signals on/from the disc, and the OCU 22 is fixed to an OPU base 22b which is provided at shafts 22a to be movable, the shafts 22a being provided in the traverse assembly (the OPU 22 is mounted on the OPU base 22b). Specifically, a semiconductor laser which irradiates a laser beam, an object lens which condenses the laser light on a recording surface of the disc, a light-receiving element which receives a laser beam reflected from the disc, etc., are mounted on the OPU base 22b.

In addition, an OPU rack 31 which transmits the driving force of a driving motor 43 (which will be described later) is provided at the OPU base 22b. Specifically, a main rack 31a which transmits driving force to move the OPU 22 (the OPU base 22b) is disposed at the lower part of the OPU rack 31, and a sub rack 31b which uses coil springs in order to prevent the generation of a gap between gear teeth of a first gear OPU 32 (a first gear OPU small gear 32b), which will be described later, and gear teeth of the main rack 31a, thereby to prevent backlash, is disposed at the upper part of the CPU rack 31.

That is, the OPU rack 31 forms a double rack in which the main rack 31a overlaps the sub rack 31b. However, since the gear teeth of the sub rack 31b extend longer to the rear side than those of the main rack 31a, there can be two cases, that is, a case where the first gear OPU 32 (the first gear OPU small gear 32b) engages with 'the main rack 31a and the sub rack 31b', and a case where the first gear OPU 32 engages with 'the sub rack 31b'.

In addition, as shown in FIG. 2, a protrusion 31c is provided at a front end (a leading end of the front side) of the main rack 31a to push (turn on) a switch 28a of the contacting sensor 28, and an OPU rack boss (a first boss) 31d (see FIG. 1) which engages with a curved groove 23a of the lever trigger 23 (which will be described later) is formed (stands) at a front end of the sub rack 31b. Also, the moving direction of the OPU 22 is the same as that of the disc tray 10 (the disc tray reciprocates between the front and rear sides).

The lever trigger 23 includes the curved groove (a first groove) 23a with which the OPU rack boss 31d engages, and a coupling boss (not shown) which is fitted with a coupling groove 44a of a cam slider 44 (which will be described later). In addition, according to the location (moving) of the OPU rack boss 31d which is fitted with the curved groove 23a, the gear teeth of the OPU rack 31 (the main rack 31a and the sub rack 31b) engage with or do not engage with the first gear OPU small gear 32b. Also, the lever trigger 23 is attached on the traverse assembly 21 such that the lever trigger 23 can reciprocate in the side direction (the vertical direction with respect to the moving direction of the disc tray) according to the location (moving) of the OPU rack boss 31d which is fitted with the curved groove 23a.

The spindle motor 24 rotates a chucked disc. Hereinafter, an elevating operation of the TAU 20 which is mounted on the spindle motor 24 for chucking (for reproducing the disc) will be described.

The traverse holder 25 also acts as a power transmission member which is fixed to the front side of the traverse assembly 21. Specifically, the traverse holder 25 includes a boss (T-boss; a second boss) 25a which engages with a cam groove 45 (which will be described later) of the cam slider 44, and ascends or descends the traverse assembly 21 (TAU 20) in conjunction with the movement of the cam slider 44.

The driving force transmitting gear set 26 includes gears which transmit driving force from a driving motor (DC motor) provided at the loader chassis unit (LCU) 40 (see FIG. 5) to reciprocate the OPU 22, or gears which transmit driving force to move the cam slider 44.

Specifically, the first gear OPU 32, the second gear OPU 33, and a gear drive 34 are journaled on the traverse assembly 21.

The first gear OPU 32 includes a first gear OPU large gear 32a which transmits the driving force of the driving motor 43, which will be described later, and the first gear OPU small gear (pinion gear) 32b which is provided below (in a direction near to the LCU 40) the center of the first gear OPU large gear 32a to transmit the driving force to the OPU rack 31. That is, in the first gear OPU 32, the first gear OPU large gear 32a is located on the first gear OPU small gear 32b, and the first gear OPU large gear 32a and the first gear OPU small gear 32b are journaled by the same shaft.

The second gear OPU 33 includes a second gear OPU large gear 33a which transmits driving force from the first gear OPU small gear 32b and a second gear OPU small gear (pinion gear) 33b which is provided below (in a direction near to the LCU 40) the center of the second gear OPU large gear 33a to transmit the driving force to the gear drive 34. That is, in the second gear OPU 33, the second gear OPU large gear 33a is located on the second gear OPU small gear 33b, and the second gear OPU large gear 33a and the second gear OPU small gear 33b are journaled by the same shaft.

The gear drive 34 transmits driving force from the second gear OPU small gear 33b, and is journaled on the traverse assembly 21.

The transmission type sensor (optical sensor) 27 obtains position detecting signals corresponding to the rotating position of the pinion gear 43b which is provided at an output shaft 43a of the driving motor 43, by scanning slits of a slit plate 43c which is provided at the output shaft 43a.

Figure 7:
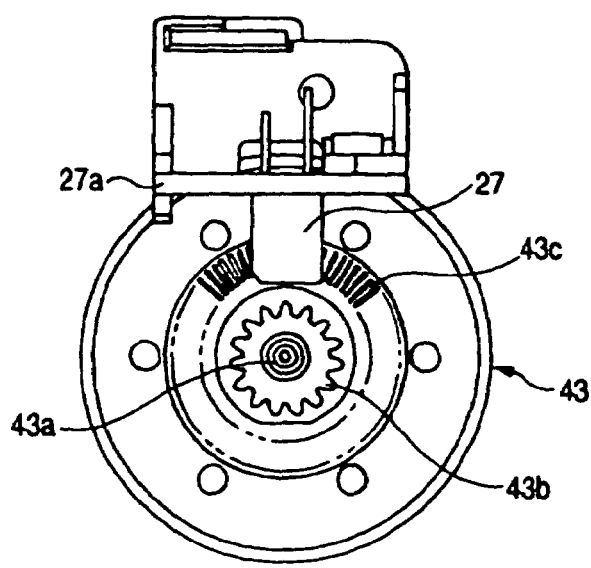
FIG. 7 is a view schematically illustrating the structure of a transmission type sensor, a driving motor, a pinion gear, and a slit plate, as viewed from the upper side.
Figure 8:
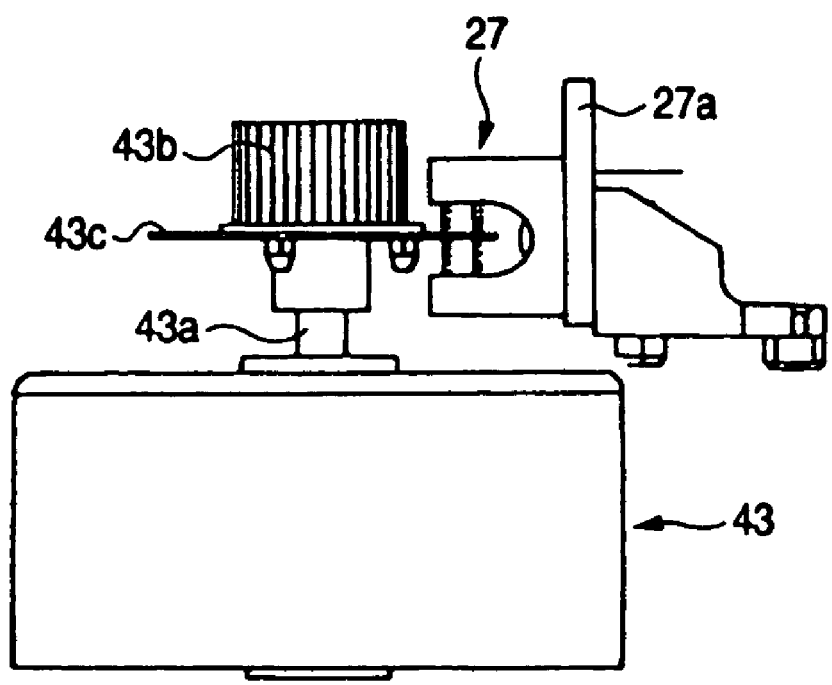
FIG. 8 is a view schematically illustrating the structure of the transmission type sensor, the driving motor, the pinion gear, and the slit plate, as viewed from the side.

Specifically, as shown in FIG. 7 (a plan view as viewed from the upper side) and FIG. 8 (a plan view as viewed from the bottom), the transmission type sensor 27 is attached to a printed substrate 27a for a sensor which is attached to the traverse assembly 21, and has a reversed C-shaped vertical section. Also, in the transmission type sensor 27, a light-emitting element is provided at one end of the reversed C shape, and a light-receiving element is provided at the other end of the reversed C shape. In addition, slit blades 43c are disposed between both ends of the reversed C shape. Therefore, according to the rotation of the slit blades 43c, there can be two cases, that is, a case where the light-receiving element can receive light from the light-emitting element and a case where the light-receiving element cannot receive light from the light-emitting element. Therefore, the transmission type sensor 27 can obtain position detecting signals corresponding to the rotating position of the pinion gear 43b, based on whether the light-receiving element receives light from the light-emitting element.

Figure 9:
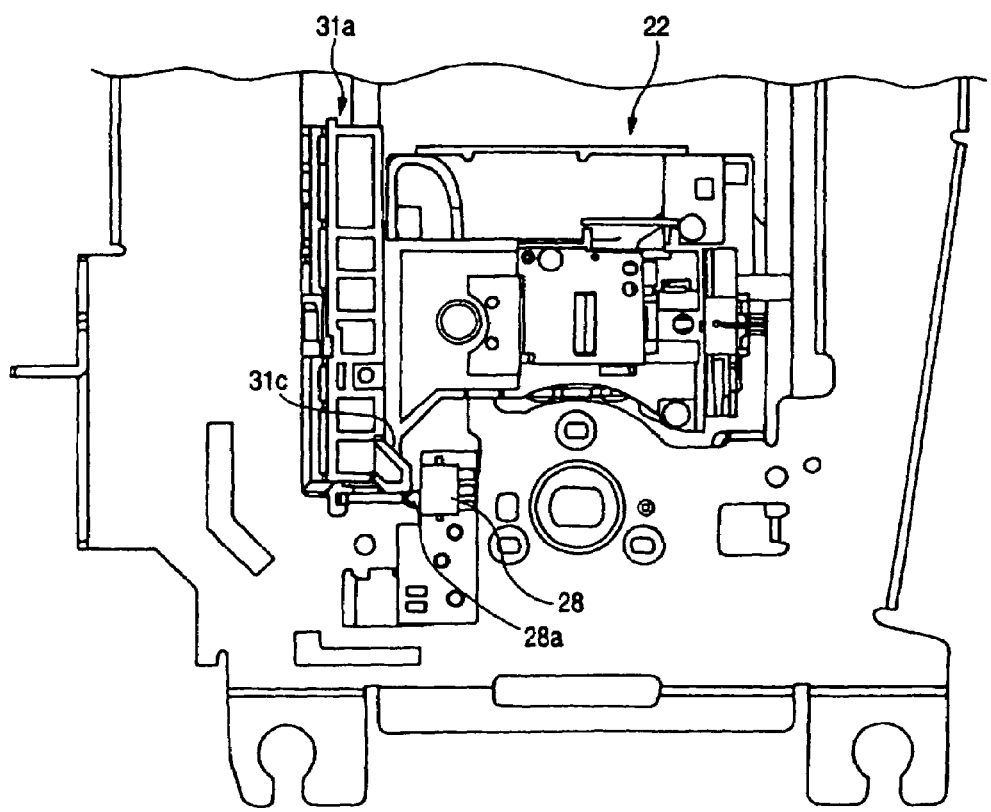
FIG. 9 is a partially enlarged view of FIG. 2.

As shown in FIG. 9, which is an enlarged view of FIG. 2, the contacting sensor 28 is provided at the rear side (the side facing the loader chassis 41) of the traverse assembly 21. In addition, a switch 28a is provided and is turned ON when the contacting sensor 28 comes into contact with the protrusion 31c provided at the main rack 31a. Meanwhile, the disc apparatus 90 of the invention controls the encoder by using the switching (ON/OFF) of the contacting sensor and the position detecting signals. The control of the encoder will be described in detail.

As regards the loader chassis unit

The loader chassis unit 40, as shown in FIG. 5, includes the loader chassis (main body) 41, a gear tray 42, the driving motor (sled motor) 43, and the cam slider 44 (see FIG. 1).

The loader chassis 41 is a main chassis which encases the TAU 20. Also, the loader chassis 41 includes the driving motor 43 and the cam slider 44.

The gear tray 42 transmits driving force from the gear drive 34, and is journaled on the loader chassis 41. In addition, the gear tray 42 has a recessed portion (an intermittent portion 42a; see FIGS. 3 and 4) provided in the shaft direction, and is provided to engage with or not to engage with the gear drive 34.

The driving motor 43 is a power source for opening and closing the disc tray 10, for reciprocating the OPU 22 and the cam slider 44 (an elevating operation of the TAU 20), and the pinion gear 43b is fitted with the output shaft 43a of the driving motor 43. In addition, a disc plate (slit plate 43c) in which slits are provided in a surface perpendicular to the output shaft 43a is provided (see FIGS. 7 and 8).

The cam slider 44 includes a coupling groove 44a (see FIG. 3) with which a coupling boss of the lever trigger 23 (not shown) engages, standing bosses 44b (see FIG. 1) which engage with the tray groves 12 of the disc tray 10, a cam groove 45 (see FIG. 3) which engages with the T-boss 25a of the traverse holder 25, and a slider rack 44c which is fitted with the gear tray 42 (see FIG. 1).

In addition, the cam slider 44 is fitted with a groove rail (not shown) which is provided perpendicular to the moving direction of the disc tray 10 in the plane of the front side of the loader chassis 41, and can reciprocate along the groove rail.

Further, the cam groove 45 is composed of two opening grooves 45a and 45b (an upper opening groove 45a and a lower opening groove 45b) which become horizontal slits at the upper and lower sides (both end sides) of the cam groove 45 when the cam slider 44 is fitted with the groove rail, and an inclined opening groove 45c which connects the horizontal slits (see FIG. 3). In addition, the T-boss 25a of the traverse holder 25 is inserted into the cam groove 45, and the traverse holder 25 ascends when the T-boss 25a moves to the upper opening groove 45a, and the traverse holder 25 descends when the T-boss 25a moves to the lower opening groove 45b.

As regards the movement of each member

Hereinafter, the movement of each member (the OPU 22, the TAU 20, and the disc tray 10) will be described with reference to FIGS. 1 to 14, particularly FIGS. 10 to 14. Meanwhile, 'solid lines' which connect each member in FIGS. 10 to 14 mean mechanical fixation (injection or screw-fastening), and 'one-dotted lines' mean engagement by the gear teeth. Also, 'double lines' mean engagement by the cam, and 'dashed lines' mean that the both are intercepted. Further, 'halftone dotted areas' mean members which contribute to the moving process or the converting process.

Figure 10:
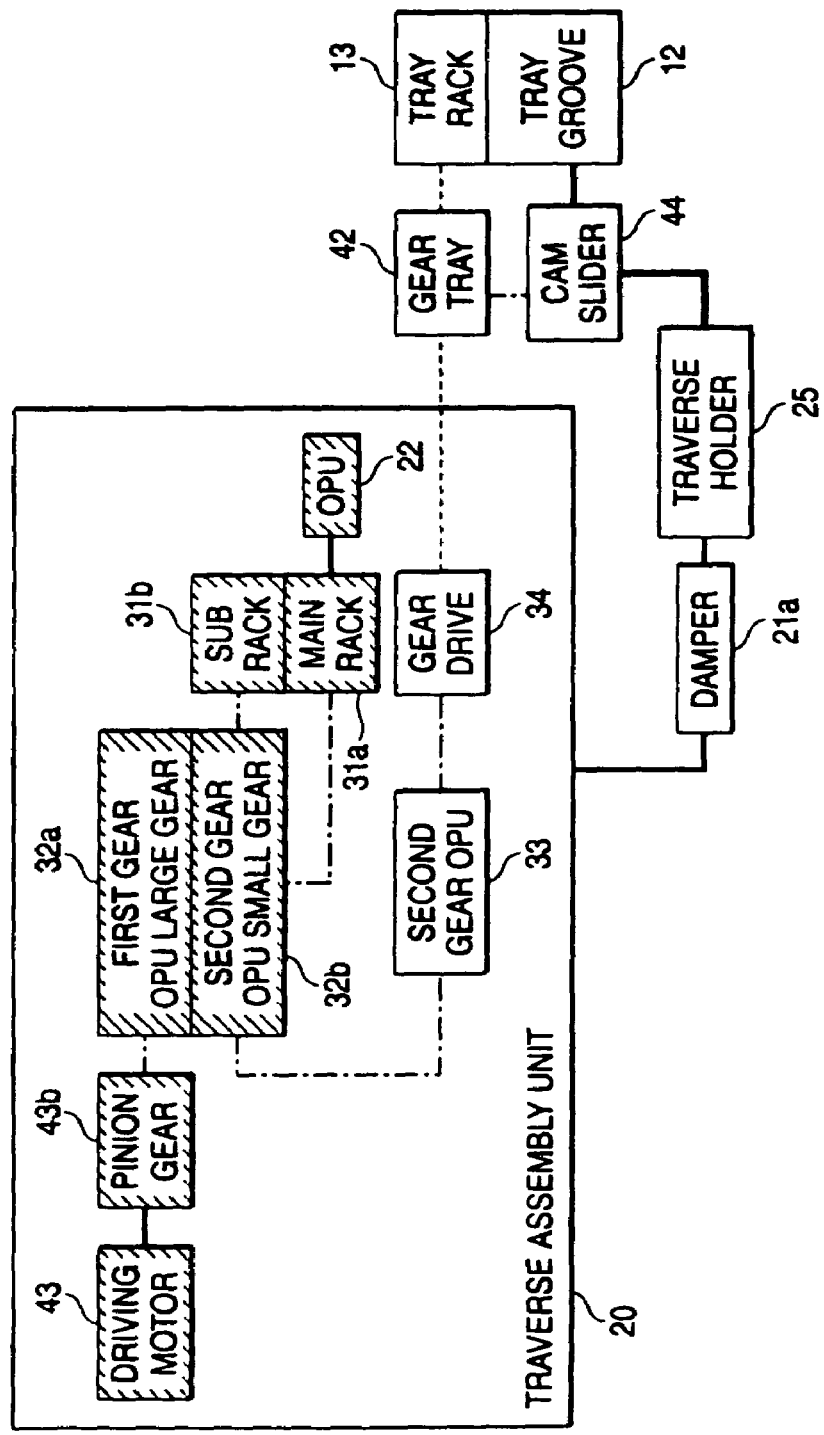
FIG. 10 is a view explaining the movement of an OPU.

As regards the movement of the OPU (see FIG. 10)

Hereinafter, the movement of the OPU 22 in the disc apparatus 90 according to the invention will be described. For example, when the reproduction of a disc, such as a DVD, is finished and a user wants to unload the disc from the disc apparatus 90 (that is, when the disc tray 10 is made open), the user pushes an opening and closing button provided at the exterior housing 11.

In this case, first, the driving motor 43 rotates in an A1 direction (clockwise direction), and then the pinion gear 43b also rotates in the A1 direction. In addition, the first gear OPU large gear 32a (that is, the first gear OPU 32) which engages with the pinion gear 43b rotates in a B1 direction. Then, the first gear OPU small gear 32b which is connected with the first gear OPU large gear 32a (connected with each other) also rotates in the B1 direction, and the OPU rack 31 (the main rack 31a and the sub rack 31b) which engages with the first gear OPU small gear 32b moves in a C1 direction. Then, the OPU base 22b to which the OPU rack 31 is attached also moves, and the OPU 22 moves in the C1 direction (the inner circumference direction of the disc).

Meanwhile, since the first gear OPU small gear 32b always engages with the second gear OPU large gear 33a and the second gear OPU small gear 33b always engages with the gear drive 34, the driving force of the driving motor 43 is always transmitted to the second gear OPU small gear 33b (the second gear OPU) and the gear drive 34. However, when the OPU 22 moves, the gear drive 34 is located in the recessed portion 42a of the gear tray 42 (see FIGS. 3 and 4). Therefore, the driving force is not transmitted to the gear tray 42 via the gear drive 34, and thus the TAU 20 and the disc tray 10 do not move.

Figure 11:
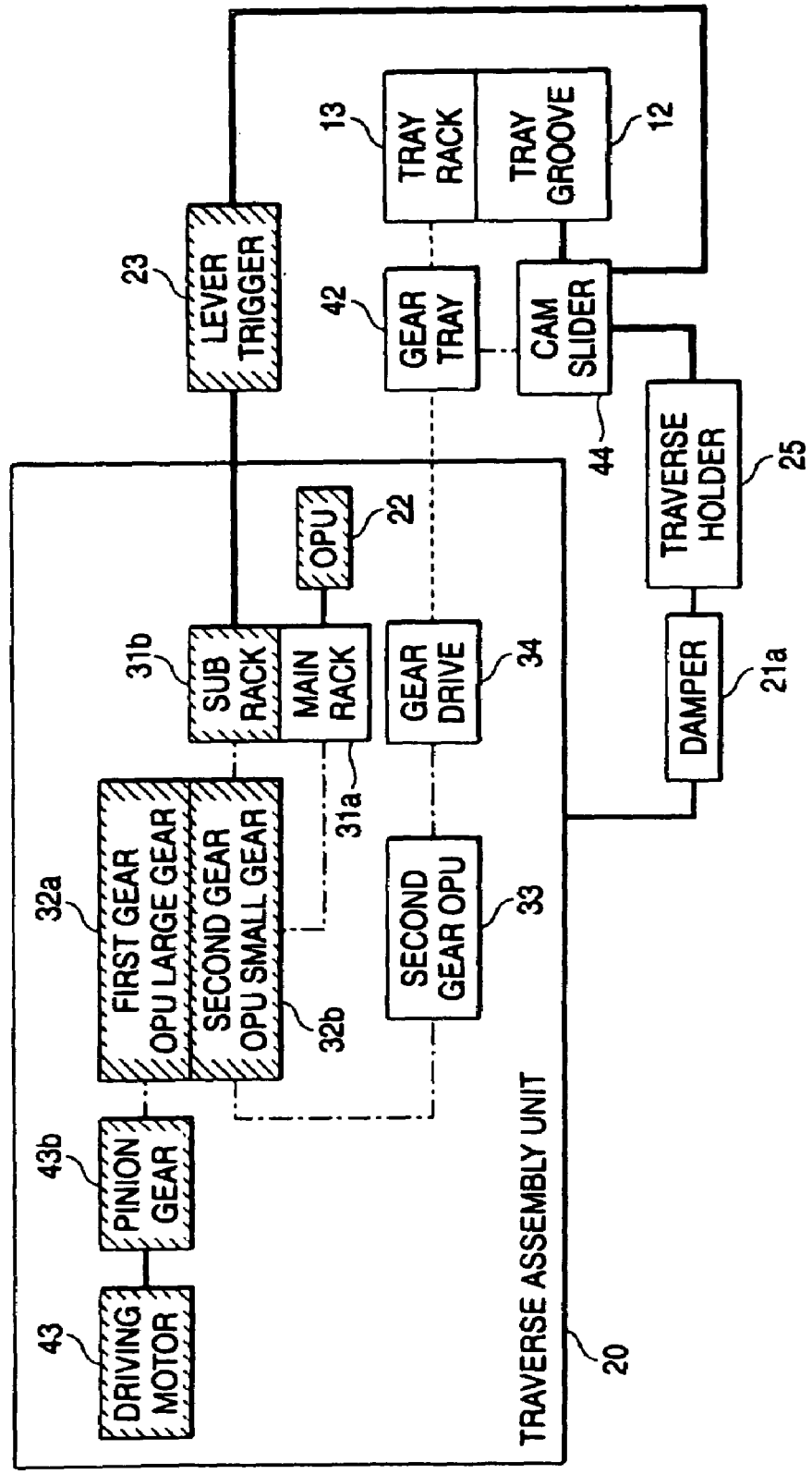
FIG. 11 is a view explaining the conversion of the movement of the OPU into the movement of a traverse assembly unit.

As regards the conversion of the movement of the OPU into the movement of the traverse assembly unit (see FIG. 11)

If the driving motor 43 is rotated even after the OPU 22 arrives at the inner circumferential position of the disc, only the sub rack 31b extending toward the rear side from the main rack 31a and the sub rack 31b which engage with the first gear OPU small gear 32b engages with the first gear OPU small gear 32b.

Then, the sub rack 31b further moves to the inner circumference of the disc. Therefore, the OPU rack boss 31d provided at the sub rack 31b becomes fitted with the curved groove 23a of the lever trigger 23, and then the OPU 22 further moves in the C1 direction. The lever trigger 23 moves in a D1 direction in conjunction with the movement of the sub rack 31b in the C1 direction. Then, the OPU rack boss 31d is locked in the end portion of the curved groove 23a. Therefore, the main rack 31a is disengaged from the first gear OPU small gear 32b, and the OPU 22 stops at the inner circumference of the disc.

Figure 12:
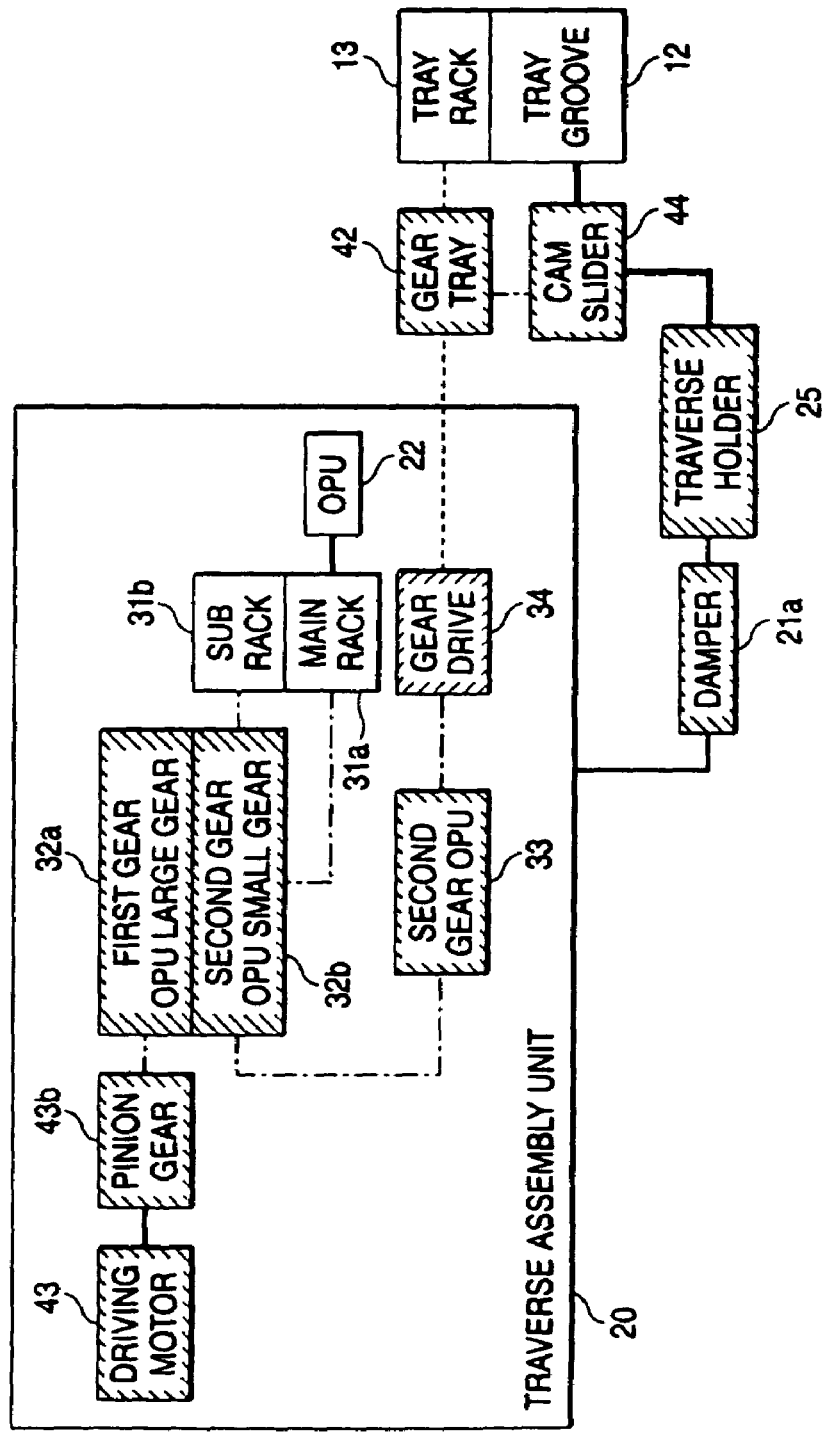
FIG. 12 is a view explaining the movement of the traverse assembly unit.

As regards the movement (descent) of the TAU (see FIG. 12)

On the other hand, a coupling boss is provided at the lever trigger 23 which moves in the D1 direction in conjunction with the movement of the sub rack 31b, and the coupling boss is fitted with the coupling groove 44a of the cam slider 44 (see FIG. 3). Therefore, the cam slider 44 slightly moves (slides) in an E1 direction in conjunction with the movement of the lever trigger 23. Then, the cam slider rack 44c of the cam slider 44 also moves in the E1 direction.

When the cam slider rack 44c moves in the E1 direction, the gear tray 42 engaging with the cam slider rack 44c rotates in the F1 direction. Then, the location of the recessed portion 42a which is provided at the gear tray 42 varies (see FIGS. 3 and 4), and the gear drive 34 engages with the gear tray 42. In this way, when the gear drive 34 engages with the gear tray 42, the driving force of the driving motor 43 is transmitted to the cam slider rack 44c and, consequently, to the cam slider 44 via the gear tray 42.

Therefore, the cam slider 44 further moves in the E1 direction by the driving force of the driving motor 43. Also, as shown in FIG. 3, since the T-boss 25a of the traverse holder 25 is fitted with the cam groove 45 of the cam slider 44, the T-boss 25a moves across the upper opening groove 45a, the inclined opening groove 45c, and the lower opening groove 45b sequentially in conjunction with the movement of the cam slider 44. Then, the traverse holder 25 descends in a G1 direction in conjunction with the movement of the T-boss 25a. As a result, the traverse assembly 21 to which the traverse holder 25 is attached and the TAU 20 descend.

Figure 13:
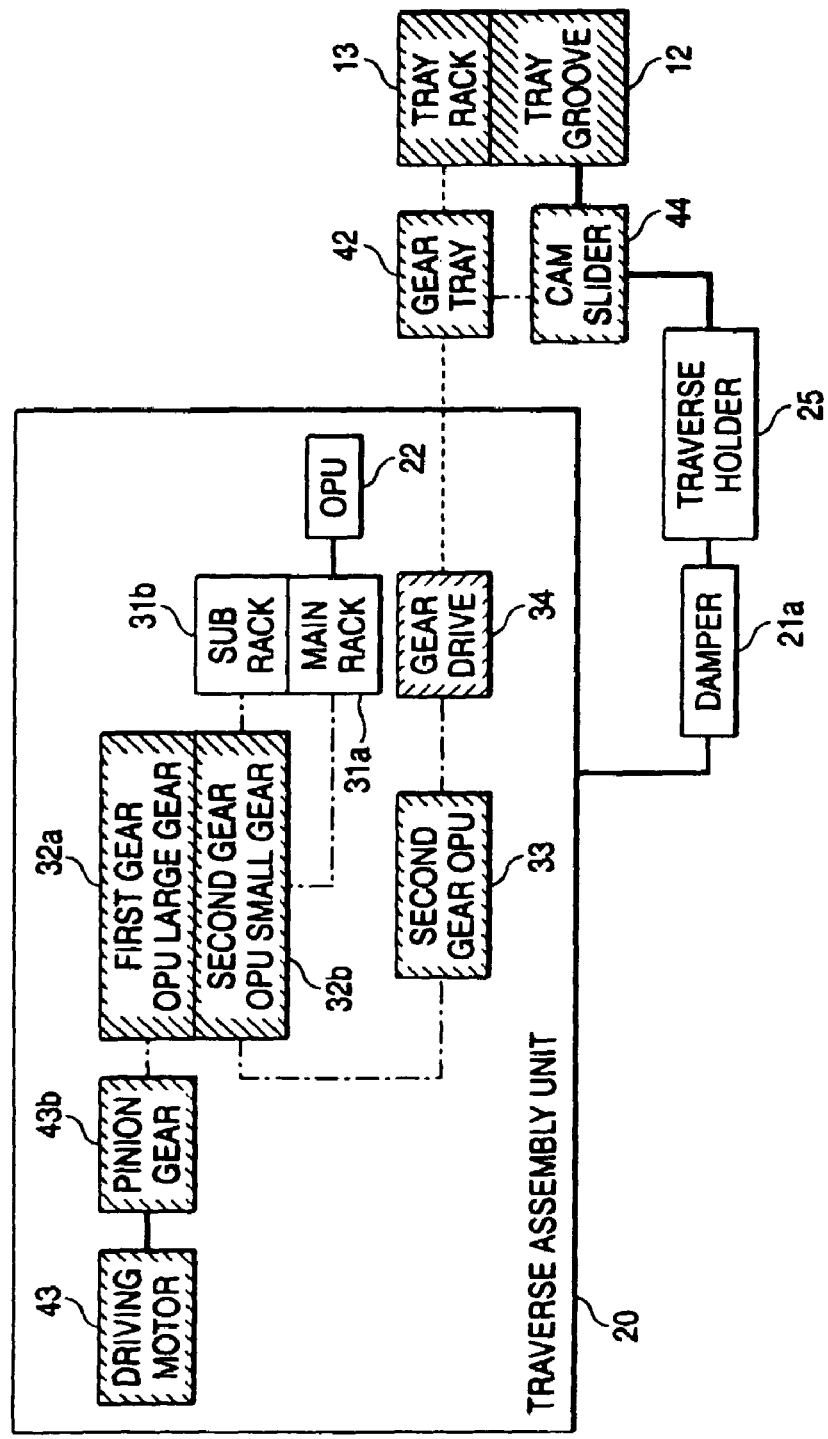
FIG. 13 is a view explaining the conversion of the movement of the traverse assembly unit into the movement of a disc tray.

As regards the conversion of the movement of the TAU into the movement of the disc tray (see FIG. 13)

Like the above, when the TAU 20 descends and the driving motor 43 is further rotated, the cam slider 44 further slides in the E1 direction. Therefore, the standing boss 44b engaging with the tray grooves 12 of the disc tray 10 also moves in the E1 direction. Then, the standing boss 44b moves to the longitudinal portion of the tray grooves which are curved step by step so as to have L shapes. Therefore, the disc tray 10 slightly moves in an H1 direction (the front direction) while the standing boss 44b moves.

As a result, the tray rack 13 also moves in the H1 direction, and then engages with the gear tray 42. In addition, as soon as the tray rack 13 engages with the gear tray 42, the cam slider 44 is disengaged from the gear tray 42.

Figure 14:
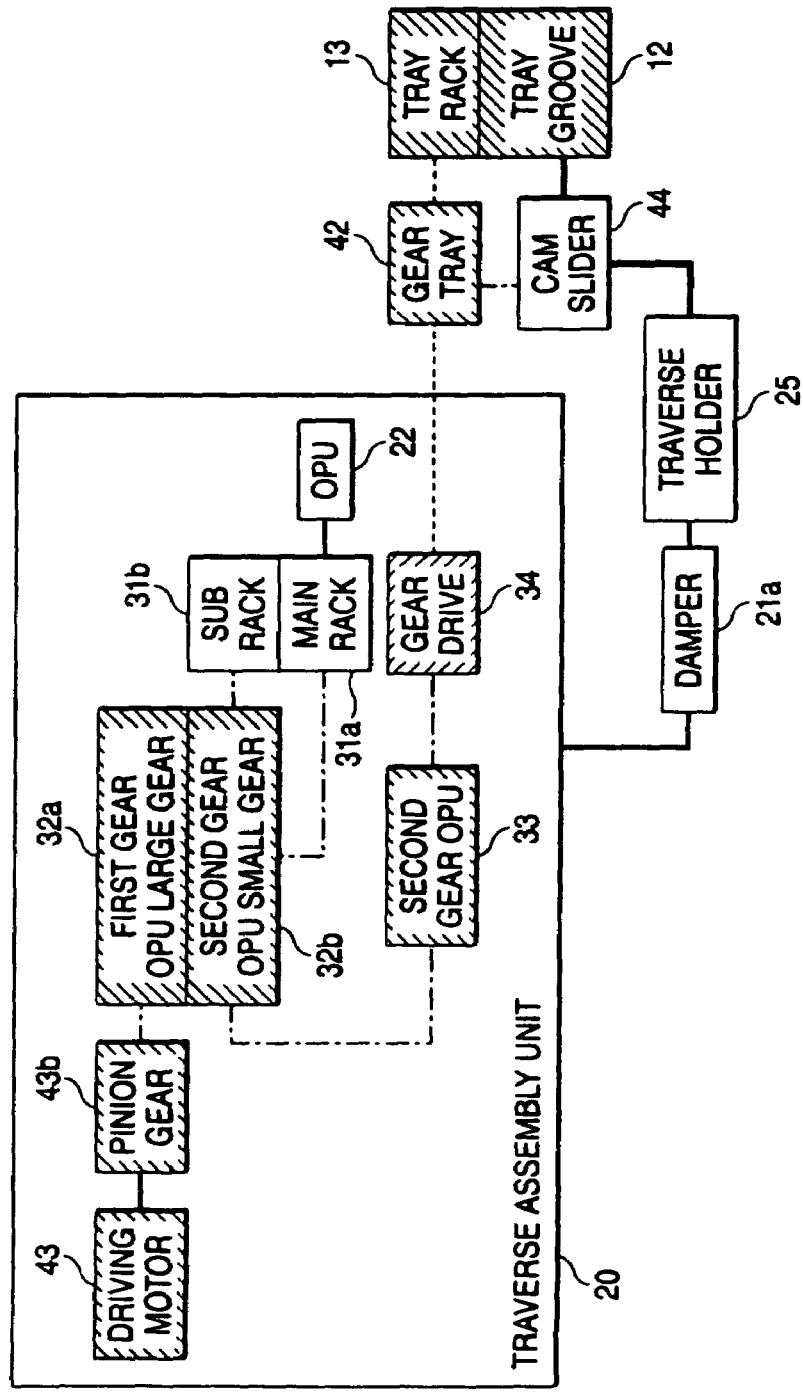
FIG. 14 is a view explaining the movement of the disc tray (tray opening)

As regards the movement (tray opening) of the disc tray (see FIG. 14)

As described above, when the tray rack 13 engages with the gear tray 42, the tray rack 13 also moves in the H1 direction in conjunction with the rotation of the gear tray 42 in the F direction. That is, the disc tray 10 moves to the front side, and then an opening operation starts.

As described above, in the disc apparatus 90 of the invention, three operations, that is, an OPU operation, a TAU operation, and a disc tray operation, can be performed by the rotation of a single driving motor 43. In addition, the slit plate 43c is provided at the driving motor 43, and the position detecting signals corresponding to the rotating position of the pinion gear 43b can be obtained by using the transmission type sensor 27. Therefore, it is possible to perform encoder control.

Further, in the above description, operations related to 'the movement of the OPU to the inner circumference of the disc', 'the descent of the TAU', and 'the opening of the disc tray' have been described. However, when the driving motor 43 is rotated in the A2 direction (counterclockwise), the respective members rotate/move in the B2 to H2 directions opposite to the B1 to H1 directions, and then operations related to 'the movement of the OPU to the outer circumference of the disc', 'the ascent of the TAU', and 'the closing of the disc tray' can also be performed. In addition, since the OPU 22 is locked as soon as the OPU 22 arrives at the inner circumference of the disc, the position of the OPU 22 does not vary during the descent of the TAU 20. On the other hand, the lock of the OPU 22 is released as soon as the TAU 20 ascends completely.

As regards encoder control

AS regards encoder control when the disc tray is opened

Figure 15:
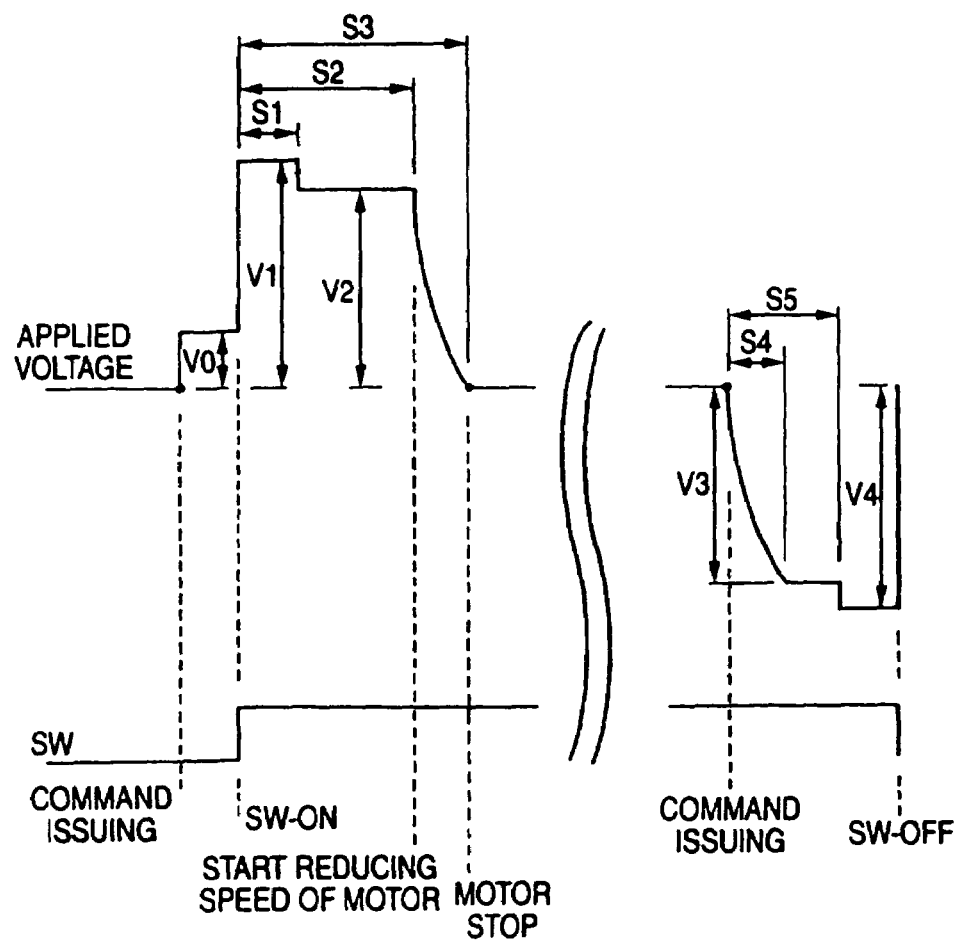
FIG. 15 is a view explaining encoder control.

Hereinafter, the encoder control will be described with reference to FIG. 15. For example, when a disc, such as a DVD, is reproduced in the disc apparatus, a user sets the disc in the disc apparatus 90. In this case, first, the user pushes an opening and closing button which is provided at the exterior housing 11. Then, a command for opening the disc tray is issued to the control unit (not shown) which is connected to the driving motor 43.

When receiving the command, the control unit supplies a voltage V0 (a first voltage) to the driving motor 43. Then, the driving motor 43 moves the OPU 22 to the inner circumference of the disc, based on the voltage V0. When the OPU 22 arrives at the inner circumference of the disc, the switch (SW) 28a of the contacting sensor 28 is pressed by the protrusion 31c of the main rack 31a, and is then turned ON (SW-ON).

When the control unit receives the ON signal, the control unit applies a voltage V1 (a second voltage) to rotate the driving motor 43 as many as a prescribed number of slits (S1; a predetermined number of rotations). Then, the TAU 20 descends by a predetermined distance according to the number of the slits.

In addition, when the driving motor 43 is rotated as many as S1, the control unit applies a voltage V2 (a third voltage) to rotate the driving motor 43 as many as a prescribed number of slits (S2; a predetermined number of rotations). Then, the control unit opens the disc tray 10 by a previously determined distance according to the number of the slits. However, when the disc tray 10 is completely opened, it is desired to stop the disc tray 10 smoothly. Therefore, in the invention, the control unit gradually decreases the voltage V2 (finally, to the voltage 0 V), and rotates the driving motor 43 as many as the prescribed number of slits (S3; a predetermined number of rotations).

As regards the encoder control when the disc tray is closed

Meanwhile, when the disc tray is closed (when it is required to close the disc tray), the control unit gradually applies a voltage V3 (a fourth voltage), which is an inverse voltage of the voltages V1 and V2, as much as a prescribed number of slits (S4; a predetermined number of rotations), and rotates the driving motor 43 as many as a prescribed number of slits (S5; a predetermined number of rotations), thereby closing the disc tray 10.

Next, the control unit applies a voltage V4 (a fifth voltage) to rotate the driving motor 43 until the switch 28a of the contacting sensor 28 is turned OFF. That is, the driving motor is rotated until the TAU 20 ascends and then the lock of the OPU 22 is released. In addition, when the lock of the OPU is released, the OPU 22 can move to the outer circumference. Also, when the control unit receives the OFF signal (lock releasing signal), the driving motor 43 is stopped.

Further, although the voltage applied to the driving motor 43 can be varied, it is preferable to satisfy the following relationship (absolute value relationship): V2<V1 and V3<V4. The number of slits (S1 to 5) can vary arbitrarily.

As regards the effect of encoder control

If 'the OPU operation', 'the TAU operation', 'the disc tray operation' are performed based on the encoder control, members can be moved very smoothly. That is, if the voltage applied to the driving motor 43 varies when the disc tray is opened or closed, the disc tray can be opened or closed very smoothly, and proper driving force can also be supplied in the ascent and descent of the traverse assembly unit when high rotating force is required (high torque is required).

In addition, since the encoder control makes it possible to know the location of the disc tray when the disc tray is completely opened, a tray open switch is not required. As a result, it is possible to reduce the manufacturing costs of the disc apparatus 90 of the invention, and to secure a high-quality moving operation of the disc tray.

In addition, the invention is not limited to the above-mentioned embodiment, and various modifications and changes can be made without departing from the spirit and scope of the invention.

The invention is useful for a disc apparatus for a CD, a DVD, and the like.

What is claimed is:

1. A disc apparatus comprising:
a driving motor which is a power source;
a disc tray that includes a tray rack for receiving driving force for opening and closing based on driving force of the driving motor and tray grooves, which are conjunction mechanisms, and that is provided to be openable in a main body of the disc apparatus in a sliding manner, with a disk mounted thereon;
an optical pickup unit which includes an OPU rack having a first boss, which irradiates a light beam onto the disc, which is provided such that it can reciprocate between inner and outer circumference of the disc, and which receives reciprocating driving force based on the driving force of the driving motor;
an inner circumference arrival detecting sensor which detects whether the optical pickup unit arrives at the inner circumference of the disc;
a traverse assembly unit which is provided such that it can be elevated, the traverse assembly unit including a traverse holder having a second boss for receiving elevating driving force based on the driving force of the driving motor; a lever trigger having a coupling boss and a first groove which engages with the first boss of the OPU rack so as to move in conjunction with the movement of the OPU; and a gear set which transmits the driving force of the driving motor;
a loader chassis unit which includes the driving motor mounted thereon; a gear tray having an intermittent portion that receives or not transmits the driving force of the driving motor via the gear set journaled thereon; and a cam slider including a cam slider rack which engages with the gear tray, a cam groove which engages with the second boss of the traverse holder, a standing boss which engages with the tray grooves of the disc tray, a coupling groove which engages with a coupling boss of the lever trigger, the cam slider interlocking the traverse holder and the disc tray and being moved in conjunction with the movement of the lever trigger; and
an encoder sensor which detects the number of rotations of the driving motor when the driving motor rotates clockwise or counterclockwise, wherein:
the OPU rack receives the driving force transmitted via the gear set, and then moves the optical pickup unit to the inner circumference of the disc, based on the number of rotations of the driving motor in the clockwise direction which is detected by the encoder sensor;
the lever trigger having the first groove engaging with the first boss is moved in conjunction with the movement of the first boss to the inner circumference by the movement of the OPU rack;
the cam slider having the coupling groove that engages with the coupling boss slides is moved in conjunction with the movement of the coupling bass according to the movement of the lever trigger;
the gear tray engaging with the cam slider rack by the sliding operation receives the driving force via the gear set to be rotated;
the cam slider further slides by the rotation of the gear tray to operate the traverse holder having second bass that engages with the cam groove, thereby moving the traverse assembly unit downward; and
the disc tray having the tray grooves that engage with the standing boss moves in the opening direction in conjunction with the sliding of the cam slider, and the tray rack engages with the gear tray, so that the disk tray is opened by the driving force transmitted through the gear set.

2. A disc apparatus comprising:
a disc tray on which a disc is mounted;
an optical pickup unit which irradiates a light beam on the disc;
a traverse assembly unit on which the optical pickup unit is mounted;
a driving motor which is a power source for operating the disc tray, the optical pickup unit, and the traverse assembly unit;
an inner circumference arrival sensor which detects whether the optical pickup unit arrives at the inner circumference of the disc; and
an encoder sensor which detects the number of rotations of the driving motor when the driving motor rotates clockwise or counterclockwise, wherein
based on the number of rotations of the driving motor in the clockwise direction which is detected by the encoder sensor, the optical pickup unit is moved to the inner circumference of the disc, and then the traverse assembly unit descends, so that the disc tray is opened.

3. The disc apparatus according to claim 2, wherein:
the optical pickup unit is moved to the inner circumference of the disc by rotating force of the driving motor based on a first voltage;
as soon as the inner circumference arrival detecting sensor detects that the optical pickup unit arrives at the inner circumference of the disc, the number of rotations of the driving motor is reduced to a first predetermined number of rotations by rotating force based on a second voltage to move the traverse assembly unit down; and
the number of rotations of the driving motor is reduced to a second predetermined number of rotations by rotating force based on a third voltage, and then the number of rotations of the driving motor is reduced to a third predetermined number of rotations by gradually lowering the third voltage to open the disc tray.

4. The disc apparatus according to claim 3, wherein absolute values of the first to third voltages satisfy the following relationship:
the first voltage<the third voltage<the second voltage.

5. The disc apparatus according to claim 2, wherein:
when the disc tray is closed, the traverse assembly unit ascends, and the optical pickup unit is moved to the outer circumference of the disc by the counterclockwise rotation of the driving motor;
the number of rotations of the driving motor increases up to a fourth predetermined number of rotations by gradually increasing the voltage to a fourth predetermined voltage, and then the number of rotations of the driving motor increases to a fifth predetermined number of rotations by rotating force based on the fourth voltage to close the disc tray; and
until the inner circumference arrival detecting sensor detects that the optical pickup unit is moved away from the inner circumference of the disc, the traverse assembly unit ascends by rotating force based on the fifth voltage.

6. The disc apparatus according to claim 5, wherein absolute values of the fourth and fifth voltages satisfy the following relationship:
the fourth voltage<the fifth voltage.

* * * * *